Nov. 1, 1966  HANS-JOACHIM TÜCKMANTEL  3,282,171
DIAPHRAGM DEVICE
Filed March 23, 1965
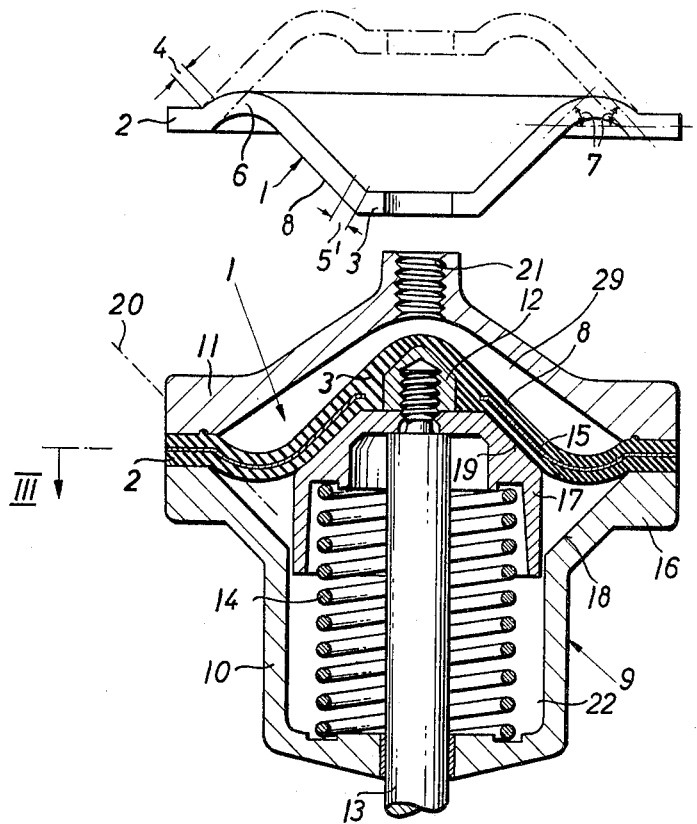
Fig. 1
Fig. 2
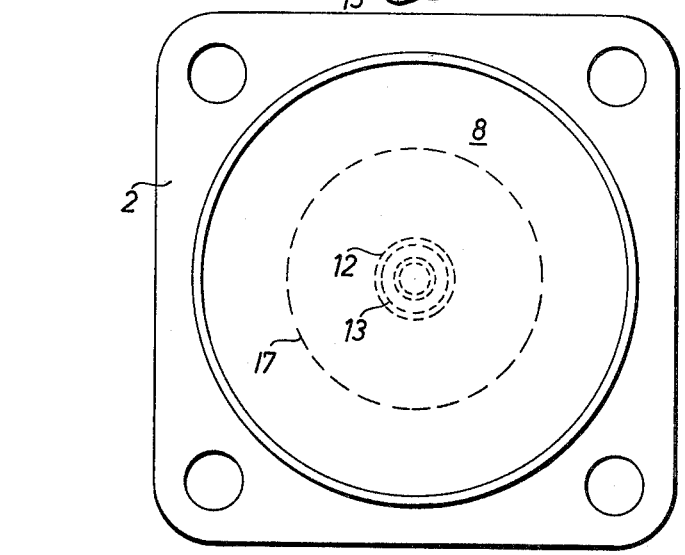
Fig. 3
INVENTOR
HANS-JOACHIM TÜCKMANTEL
BY
Lowry & Rinehart
ATTYS.

United States Patent Office 3,282,171
Patented Nov. 1, 1966

3,282,171
DIAPHRAGM DEVICE
Hans-Joachim Tückmantel, Burscheid, Bezirk Dusseldorf, Germany, assignor to Hochdruck-Dichtungs-Fabrik Schmitz & Schulte, Burscheid, Bezirk Dusseldorf, Germany
Filed Mar. 23, 1965, Ser. No. 442,082
Claims priority, application Germany, Mar. 25, 1964, H 52,161
9 Claims. (Cl. 92—99)

This invention relates to a novel diaphragm device for separating two adjacent chambers under identical or differential pressures by means of a flexible elastic diaphragm which is fixedly clamped at a periphery thereof between opposing portions of a housing or similar apparatus.

It is conventional to employ plate-type or so-called rolling diaphragm devices as adjusting units for valves or other pressure or fluid operative devices. Such plate-type diaphragm devices are generally undesirable because they permit only a relatively short travel of the diaphragm and cannot reliably insure wide range control of apparatus with which such devices are associated. On the other hand, while rolling diaphragm devices permit relatively longer diaphragm travel the diaphragms thereof are subjected to considerable tensile stresses and attendant stretching. This stressing and stretching is extremely intolerable if the diaphragm includes a textile fabic insert which is generally necessary in order to reinforce the diaphragm to withstand relatively high operating pressures.

In order to avoid the above-noted disadvantages, rolling diaphragm devices have been constructed having a diaphragm of a frusto-conical configuration with an outer periphery thereof fixed between opposing portions of a housing. In such arrangements the diaphragm is also supported at its inner periphery at a central portion to which is attached an operating member, such as a piston rod. When such a diaphragm is subjected to fluid pressure a looped or curved portion is formed in the diaphragm which encloses an acute angle with an adjoining portion of the diaphragm. The angle is limited to an acute angle because the diaphragm is constructed to abut a wall extending parallel to the longitudinal axis of the piston and/or the housing. As a result an undesirable abrupt or sharp inflexion is formed in the loop portion of the diaphragm. Such a diaphragm construction is only possible for diaphragms of relatively thin cross-section, e.g. diaphragms having textile fabric inserts covered with a thin coating of elastomeric material which are unsuited for operating under high pressure conditions.

It is, therefore, an object of this invention to provide a novel diaphragm device which overcomes the above-noted disadvantages in conventional devices and, in particular, provides a device having a diaphragm of the type including a textile fabric insert which is deflectable over a relatively large distance under high operating pressures, yet is relatively unstressed and unstretched during the operation thereof.

A further object of this invention is to provide a diaphragm which, as viewed in cross-section, includes inner and outer peripheral portions, the inner peripheral portion being fixed to a housing, the outer peripheral portion being fixed to an operating member, the diaphragm further including a nondeformable inclined transition portion immediately inward of the outer peripheral portion followed by an arcuate portion having identical entrance and exit angles, and the arcuate portion blending into a conical portion, thereby defining a shallow loop portion having an unchanging or constant cross-sectional shape which permits considerable travel of the diaphragm in relationship to the diameter thereof.

Still another object of the invention is to provide a diaphragm constructed in the manner just described in which the entrance and exit angles remain constant, and the loop portion is displaceable between the inner and outer peripheral portion and vice versa while maintaining the constant shape thereof whereby a mid-portion of the diaphragm is not subjected to stretching and the diaphragm can be relatively thick and durable.

The invention will be best understood by reference to the following detailed description, appended claims and drawings in which:

FIG. 1 is a diametrical cross-sectional view taken through a novel diaphragm of this invention, and illustrates in solid and phantom lines two positions of the diaphragm and a loop portion thereof having a constant cross-sectional configuration in each of the illustrated and all other positions of the diaphragm;

FIG. 2 is an axial sectional view through a diaphragm device constructed in accordance with this invention, and illustrates the mounting of a diaphragm partitioning the device to form two operating chambers, and FIG. 3 is a sectional view taken generally along line III—III of FIG. 2, and illustrates the generally circular shape of the diaphragm in top plan.

Referring to the drawing, a diaphragm 1 constructed in accordance with this invention is shown in FIG. 1 and comprises an outer peripheral portion 2 and an inner peripheral portion 3. The diaphragm 1 is so formed that the two peripheral portions 2 and 3 are followed by inclined transition portions 4 and 5, respectively, which are non-deformable. The two-inclined transition portions 4 and 5 extend toward the same side of the diaphragm from a horizontal plane through the respective peripheral portions 2 and 3, i.e. upwardly in the view shown in FIG. 1. Each non-deformable inclined transition portion, e.g. the inclined transition portion 4, is followed by an arcuate portion 6 of the diaphragm 1 having identical entrance and exit angles 7, ranging between 30–60 degrees but preferably being 45°. Radially inwardly of the arcuate portion 6 the diaphragm 1 includes a generally frusto-conical portion 8 which merges into the inclined transition portion 5 adjacent the inner peripheral portion 3. During the operation of the diaphragm 1 between the solid and phantom outline positions of FIG. 1, the arcuate portion 6 of the diaphragm 1, which is a half-corrugation or loop portion, moves from the outer peripheral portion 2 to the inner portion 3 at the uppermost position of the travel of the diaphragm which is indicated in phantom outline in FIG. 1. Because of the non-deformable inclined transition portions 4 and 5, the entrance or entry and exit angles 7 remain constant as the half-corrugation 6 is radially displaced as, for example, as the half-corrugation 6 moves radially inwardly from the solid to the phantom outline position in FIG. 1 as the inner peripheral portion moves upwardly between these two illustrated positions and vice versa.

The diaphragm remains in any intermediate position without snapping-over or the like into the extreme position. As a result, the creep to which even a thick diaphragm is subjected is eliminated or reduced to a minimum.

In the example shown in FIGS 2 and 3, which illustrates the diaphragm 1 of the invention used in a diaphragm device 9, the diaphragm 1 is fixed between a lower housing portion 10 and an upper housing portion or cover 11. The inner peripheral portion 3 covers and is secured to a core 12 which is connected to a piston rod 13. Arranged concentrically relative to the piston rod 13 in a lower chamber 22 is a spring 14 which supplies the opposing force for a pressure medium introduced through an aperture 21 into an upper chamber 29 of the device 9.

The diaphragm 1 of FIGS. 2 and 3 is identical to the diaphragm of FIG. 1 but includes a textile fabric insert 15. Portions 16 and 17 of the device 9 are so constructed that, as viewed in FIG. 2, they constitute substantially V-shaped opposed support portions relative to one another having respective conical support surfaces 18 and 19. In this case the conical surface 18 corresponds to an angle 20 of the non-deformable inclined transition portion 4 of FIG. 1. The supporting portion 16 is fixed while the other supporting portion 17 can move in an axial direction with the piston rod 13.

What is claimed is:

1. A diaphragm device compising a housing, a diaphragm partitioning said housing into a pair of chambers, said diaphragm including inner and outer peripheral portions, said outer peripheral portion being fixed to said housing, an operable member fixed to said inner peripheral portion for movement upon the movement of said diaphragm, an inclined non-deformable transition portion adjacent each of said inner and outer peripheral portions, said inner and outer peripheral portion being in spaced planes, said transition portion being disposed to the same side of the planes of the adjacent peripheral portions, one of said transition portions merging into an arcuate portion having identical entrance and exit angles, and a frusto-conical portion between said arcuate portion and the other of said transition portions, whereby upon movement of said diaphragm said arcuate portion moves between said transition portions and maintains said identical angular relationship.

2. The diaphragm device as defined in claim 1 wherein said angles range between 30–60 degrees.

3. The diaphragm device as defined in claim 1 wherein said angles are each approximately 45 degrees.

4. The diaphragm device as defined in claim 1 wherein said housing includes a chamber wall portion at each side of said diaphragm, and said chamber wall portions having opposed frusto-conical supporting surfaces.

5. The diaphragm device as defined in claim 1 wherein a textile insert is wholly embedded in said diaphragm.

6. A diaphragm comprising a generally flexible circular body having inner and outer peripheral portions, said peripheral portions occupying axially spaced parallel planes, a non-deformable transition portion adjacent and inclined relative to each of said inner and outer peripheral portions, said transition portions being disposed to the same side of the planes of the adjacent peripheral portions. one of said transition portions merging into an arcuate portion having identical entrance and exit angles, and a frusto-conical portion between said arcuate portion and the other of said transition portions, whereby said arcuate portion is capable of movement between said transition portions while maintaining said identical angular relationship.

7. The diaphragm as defined in claim 6 wherein said entrance and exit angles range between 30–60 degrees.

8. The diaphragm as defined in claim 6 wherein said entrance and exit angles are each approximately 45 degrees.

9. The diaphragm as defined in claim 6 wherein a fabric insert is embedded in said diaphragm.

References Cited by the Examiner

UNITED STATES PATENTS

| | | | |
|---|---|---|---|
| 768,984 | 8/1904 | George | 92—103 |
| 1,790,206 | 1/1931 | Farmer | 92—103 |
| 2,564,693 | 8/1951 | Hornbostel | 92—103 |
| 2,670,171 | 2/1954 | Holt | 92—99 X |
| 2,775,983 | 1/1957 | Johnson et al. | 92—103 X |
| 2,840,003 | 6/1958 | Johnson et al. | 92—103 X |
| 3,207,472 | 9/1965 | Seltsam | 251—331 |

MARTIN P. SCHWADRON, *Primary Examiner.*

I. C. COHEN. *Assistant Examiner.*